United States Patent [19]

Mimura et al.

[11] 3,880,740
[45] Apr. 29, 1975

[54] CULTIVATION OF EPSILON-CAPROLACTAM-UTILIZING MICROORGANISM

[75] Inventors: Akio Mimura, Miyazaki; Shiro Hayakawa, Tokyo; Takashi Iguchi, Miyazaki, all of Japan

[73] Assignee: Asahi Kasei Kogyo Kabushiki Kaisha, Osaka, Japan

[22] Filed: Aug. 31, 1973

[21] Appl. No.: 393,340

[30] Foreign Application Priority Data
Sept. 1, 1972  Japan................................ 47-87121

[52] U.S. Cl.................................... 195/29; 195/96
[51] Int. Cl.............................................. C12b 1/00
[58] Field of Search................................ 195/29, 96

[56] References Cited
OTHER PUBLICATIONS
Livke et al., "Purification of Waste Water from Caprolactam Production," Cited in Chemical Abstracts 65:16668g.

*Primary Examiner*—A. Louis Monacell
*Assistant Examiner*—R. B. Penland
*Attorney, Agent, or Firm*—Cooper, Dunham, Clark, Griffin & Moran

[57] ABSTRACT

A strain of the novel species *Pseudomonas lactamolyticus* (NRRL B-5749), which has an ability of utilizing ε-caprolactam as sole carbon and nitrogen sources, is cultured in a culturing medium under aerobic conditions. The process is useful for a treatment of polyamide plant waste liquor which contains ε-caprolactam, whereby the waste liquor is decreased in BOD and this is purified.

6 Claims, No Drawings

CULTIVATION OF EPSILON-CAPROLACTAM-UTILIZING MICROORGANISM

FIELD OF THE INVENTION

This invention relates to a process for culturing a microorganism which can utilize ε-caprolactam.

BACKGROUND OF THE INVENTION

At the polymer purification step in the production of polyamides, e.g. nylon 6, unreacted monomer is separated in a proportion of about 10 percent. Hitherto, a major portion of said monomer has been recovered and recycled, and the remainder has been abandoned with the waste liquor. Since the monomer contained in the waste liquor is at the low concentration of about 1,000 p.p.m., the recovery thereof is not economically feasible. However, it is desirable that the waste liquor not be abandoned to the environment in view of its BOD (biological oxygen demand), so that the effective recovery or removal of the dilute monomer is required.

Various microorganisms can be grown which utilize ε-caprolactam as the sole carbon source, for example Corynebacterium (Japanese Patent Specification No. 8,007/67), *Achromobacter cycloclastes*, *Corynebacterium roseum*, *Pseudomonas aeruginosa*, *Pseudomonas desmolytica* and *Pseudomonas ovalis* (Journal of General and Applied Microbiology, Vol. 13, page 125, 1967), etc.

After extensive search on effective utilization of ε-caprolactam recovered from waste liquor from a polyamide production factory, the present inventors succeeded in isolating a novel species capable of utilizing ε-caprolactam in large quantities, and found a process for micological removal of ε-caprolactam.

SUMMARY OF THE INVENTION

An object of the present invention is to provide a process for culturing an ε-caprolactam-utilizing strain belonging to the novel species *Pseudomonas lactamolyticus* (NRRL B-5749) in a medium containing ε-caprolactam as carbon and nitrogen sources.

Another object of the invention is to provide a process for purification of a polyamide plant waste liquor.

A further object of the invention is to provide a process for removing ε-caprolactam contained in a polyamide plant waste liquor by use of a microorganism capable of utilizing the ε-caprolactam as carbon and nitrogen sources.

*Pseudomonas lactamolyticus* used in the present invention does not coincide with any of the known strains, and has been identified as a novel species in view of the morphological, cultural and physiological properties mentioned below.

(a) Morphological properties:
- Shape: Rods
- Size: 0.7 to 0.9 by 1.5 to 3.5 microns
- Motility: Motile with many monopolar flagella.
- Pleomorphism of cells: None
- Spores: None
- Gram staining: Gram-negative
- Acid-fast staining: Negative (b) Cultural properties:
- Beef extract agar plate culture:
  Good growth, colonies circular, surface smooth, convexed, glossy, transparent or translucent. Edges entire, buttery, colonies cream-colored. No pigment formation.
- Beef extract agar slant culture:
  Good growth, thread, convexed. Surface glossy and smooth, translucent, cream-colored. Buttery, no pigment formation.
- Beef extract liquid culture:
  Thin pellicle, turbid sediment formed. No pigment formation.
- Gelatin stab culture (26°C. 14 days):
  Surface growth, no liquefaction.

(c) Physiological properties:
- Growth temperature: 18° to 37°C. No growth at 42°C.
- Optimum growth temperature: 25° to 30°C.
- Growth pH: 5.0 to 10.0
- Optimum growth pH: 6.0 to 8.5
- Oxygen demand: Aerobic
- Indole formation reaction: Negative
- Nitrate reduction reaction: Positive
- Formation of hydrogen sulfide: Negative
- Decomposition of starch: Negative
- Litmus milk reaction: Negative. No such changes as coagulation and liquefaction of milk
- MR test: Negative
- VP test: Negative
- Catalase: Positive
- Urease: Negative
- Ammonia: Produced from peptone water
- Sodium chloride resistance: Growth up to 5%
- Production of pigment in glycerin media: Negative
- Acid production from carbohydrates:
  - Glucose: +
  - Arabinose: +
  - Xylose: +
  - Maltose: −
  - Sucrose: −
- Utilization of carbon sources:
  - Citric acid: +
  - Methanol: −
  - Ethanol: +
  - n-Hexadecane: −
  - Benzene: −
  - Toluene: −
  - Naphthalene: −
  - Acetic acid: +
  - ε-Aminocaproic acid: +

These properties have been examined with reference to Bergey's Manual of Determinative Bacteriology, Seventh Edition, to determine that the species belongs to the genus Pseudomonas. The isolated strain was considered similar to the species *Pseudomonas desmolytica* or *Pseudomonas rathonis*, but is obviously different therefrom in view of the key of utilization of hydrocarbons. Accordingly, it has been concluded that the strain of the present invention belongs to a novel species, and denominated the strain as *Pseudomonas lactamolyticus*.

A specific example of the species is *Pseudomonas lactamlyticus* SB-1442 (NRRL No. B-5749).

Conditions utilized for cultivation of the microorganism of this invention do not substantially differ from the ordinary growth conditions of other microorganisms. The microorganism is preferably grown in a medium containing ε-caprolactam at a concentration of 0.2 to 4.0 percent by weight. However, if the concentration of ε-caprolactam in the medium is more than 1.5 percent, the microorganism is inhibited in growth. In case high concentration ε-caprolactam is used, therefore, it is necessary to add the compound in small increments. The medium does not require a nitrogen source, but the growth of the microorganism becomes vigorous if a small amount of a nitrogen source such as ammonium sulfate, ammonium chloride, ammonia or urea which is used for orginary fermentation is added. Other inorganic salts may be added to the medium, such as potassium phosphate, magnesium sulfate, iron sulfate, zinc sulfate and manganese sulfate. Addition of such organo-nitrogen compounds as cane molasses, corn steep liquor and yeast extract helps growth of the microorganism.

The cultivation is ordinarily carried out according to shaking or stirring culture under aerobic conditions at a temperature from 18° to 37°C. and a pH from 5 to 9. The cultivation time varies depending on the concentration of added carbon source, and is ordinarily from 10 to 50 hours.

An example of the medium used in the present invention is shown in Table 1.

Table 1

| | |
|---|---|
| ε-caprolactam | 1.0% by weight |
| Monopotassium phosphate | 0.075% by weight |
| Magnesium sulfate | 0.025% |
| Ferrous sulfate | 0.003% by weight |
| Zinc sulfate | 0.002% by weight |
| Manganese sulfate | 0.002% by weight |
| pH | 7.0 |

Separation of microorganism cells from the cultured medium is easily effected by conventional methods, for example, centrifugation or filtration with or without an agglomerating agent. Calcium compounds and/or iron compounds are suggested as the agglomerating agent (J. Biochem. Microbiolog. Tech. & Engl., 3, No. 4, 359, 1961). Alternatively, the cultured medium may be heated in order to help agglomeration of cells. The thus obtained sludge contains no poisonous heavy metal, and hence can be effectively utilized as fodders, feeds or soil improvers after drying for example by spray drying, hot air drying or drum dryer drying.

The present invention is illustrated in detail in the following examples, which are merely illustrative and do not limit the scope of the invention. In the examples, all percentages are by weight.

EXAMPLE 1

The medium shown in Table 1 was mixed with 2.0 percent of agar powder to prepare a stock medium. *Pseudomonas lactamolyticus* (NRRL No. B-5749) was inoculated in the stock medium and cultured at 30°C. for 24 hours to obtain a stock slant. Subsequently, 50 ml. of the medium shown in Table 1 was charged into a 500 ml. shaking flask and then sterilized. The aforesaid stock slant was inoculated in the above-mentioned medium and shaken reciprocally at 30°C. for 24 hours to prepare a seed culture. Each 4 percent of the seed culture was inoculated into an ε-caprolactam medium, which had been prepared in the same manner as in the case of the seed culture, and then reciprocally shaken at 30°C. for 24 hours. After the cultivation, the culture liquor was heat treated at 80°C. for 10 minutes and centrifuged to separate cells, which were then washed with water and dried. The cells were obtained in a proportion of 5.2 g. per liter of the culture liquor. No ε-caprolactam was observed in the separated liquor.

The cells were rich in protein as seen in the following analytical results:

| | |
|---|---|
| Water | 2.3% dry weight |
| Crude protein | 72.1% dry weight |
| Crude fat | 5.9% dry weight |
| Crude ash | 7.2% dry weight |

EXAMPLE 2

In this example was used the same medium as shown in Table 1, except that in place of the ε-caprolactam, a waste liquor containing 0.45 percent by weight of ε-caprolactam which had been discharged from polyamide, e.g. nylon 6 production factory was used as a diluting liquid. 2 Liters of this liquid was fed to a 5 liter-standard jar fermenter. Each 4 percent of a preculture liquor of *Pseudomonas lactamolyticus* (NRRL No. B-5749), which had been prepared in the same manner as in Example 1, was inoculated into the medium, and then aerobically stirred while introducing air at a rate of 2 liters per minute, utilizing a stirring rate of 600 r.p.m., a temperature of 30°C. and a pH of 7.0 ± 0.3. The cultivation was complete in a period of 6 hours. The highest specific growth rate during the cultivation was 0.76 (l/hr.), and thus the microorganism grew at an extremely high rate. 2 Liters of the culture liquor was centrifuged to obtain 4.7 g. of cells, yield 52.2 percent by weight of the ε-caprolactam. The BOD value of the waste liquor was 9,400 p.p.m., whereas that of the supernatant freed from the cells after cultivation was 960 p.p.m., and the BOD removal ratio was 89.7 percent.

The cells were rich in protein as seen in the following analytical results:

| | |
|---|---|
| Water | 2.9% by dry weight |
| Crude protein | 68.3% by dry weight |
| Crude fat | 6.5% by dry weight |
| Crude ash | 7.5% by dry weight |

EXAMPLE 3

The same medium as shown in Table 1 was used except the ε-caprolactam was used as a 0.4 percent aqueous solution. *Pseudomonas lactamolyticus* (NRRL No. B-5749) was cultured under aerobic conditions at 30°C. Calcium hydroxide (0.45 percent based on the solution) was added to the resulting culture liquor (suspension), stirred for 10 minutes and allowed to stand for 10 minutes. The pH of suspension became 12.0. Then, 0.06 percent of ferric sulfate was added to the suspension and stirred for 10 minutes. The flock thus formed was filtered to obtain a solid having a water content of 75 percent and a transparent liquid filtrate.

What is claimed is:

1. A process for the removal of ε-caprolactam from waste liquor containing it at a concentration of from 0.1 percent to 4 percent by weight which comprises aerobically culturing *Pseudomonas lactamolyticus* NRRL B-5749 in said waste liquor.

2. A process as in claim 1 wherein the waste liquor source is a polyamide plant.

3. A process as in claim 1 wherein the ε-caprolactam concentration is from 0.2 percent to 4 percent.

4. A process as in claim 1 including recovering the microbial cells.

5. A process according to claim 1, wherein a nitrogen source is supplemented to the medium.

6. A process according to claim 1, wherein the culturing is effected at a temperature of 18° to 37°C. and pH of 5 to 9.

* * * * *